United States Patent
Gorin et al.

(10) Patent No.: US 11,746,195 B2
(45) Date of Patent: Sep. 5, 2023

(54) PROCESS FOR FORMING A POWDER

(71) Applicant: Dow Global Technologies LLC, Midland, MI (US)

(72) Inventors: Craig F. Gorin, Midland, MI (US); Sanjib Biswas, Lake Jackson, TX (US); Yi Fan, Midland, MI (US); Thomas L. Tomczak, Midland, MI (US); Daniel L. Dermody, Midland, MI (US); Harpreet Singh, Lake Jackson, TX (US)

( * ) Notice: Subject to any disclaimer, the term of this patent is extended or adjusted under 35 U.S.C. 154(b) by 573 days.

(21) Appl. No.: 16/758,245

(22) PCT Filed: Oct. 22, 2018

(86) PCT No.: PCT/US2018/056839
§ 371 (c)(1),
(2) Date: Apr. 22, 2020

(87) PCT Pub. No.: WO2019/083873
PCT Pub. Date: May 2, 2019

(65) Prior Publication Data
US 2020/0339763 A1    Oct. 29, 2020

Related U.S. Application Data

(60) Provisional application No. 62/576,907, filed on Oct. 25, 2017.

(51) Int. Cl.
| | | |
|---|---|---|
| *B29B 9/12* | (2006.01) | |
| *B29B 9/16* | (2006.01) | |
| *C08J 3/12* | (2006.01) | |
| *C08L 23/08* | (2006.01) | |
| *B29K 33/00* | (2006.01) | |
| *B33Y 70/00* | (2020.01) | |

(52) U.S. Cl.
CPC .............. *C08J 3/124* (2013.01); *B29B 9/12* (2013.01); *B29B 9/16* (2013.01); *C08L 23/0815* (2013.01); *B29B 2009/125* (2013.01); *B29B 2009/163* (2013.01); *B29B 2009/168* (2013.01); *B29K 2023/04* (2013.01); *B29K 2033/08* (2013.01); *B29K 2033/12* (2013.01); *B33Y 70/00* (2014.12); *C08J 2323/08* (2013.01); *C08L 2201/54* (2013.01)

(58) Field of Classification Search
CPC ...... C08F 10/02; C08F 110/02; C08F 210/02; C08F 293/00; C08F 293/005; C08L 23/08; C08L 23/06; C08L 53/00; B29B 9/00; B29B 9/12; B29B 9/16; B29B 2009/125; B29B 2009/163; B29B 2009/168; B29K 2023/04; C08J 3/124
See application file for complete search history.

(56) References Cited

U.S. PATENT DOCUMENTS

| | | | |
|---|---|---|---|
| 3,746,681 A | 7/1973 | McClain | |
| 4,599,392 A | 7/1986 | McKinney et al. | |
| 4,988,781 A | 1/1991 | McKinney et al. | |
| 5,677,383 A | 10/1997 | Chum et al. | |
| 5,938,437 A | 8/1999 | Devincenzo | |
| 6,111,023 A | 8/2000 | Chum et al. | |
| 6,984,695 B2 | 1/2006 | Brown et al. | |
| 7,608,668 B2 | 10/2009 | Li Pi Shan et al. | |
| 7,763,676 B2 | 7/2010 | Moncla et al. | |
| 7,935,755 B2 | 5/2011 | Moncla et al. | |
| 9,132,588 B2 | 9/2015 | Lucas et al. | |
| 2008/0009586 A1 | 1/2008 | Vansumeren et al. | |
| 2013/0030086 A1 * | 1/2013 | Baumann | C08L 23/0815 524/5 |
| 2016/0160016 A1 | 6/2016 | Lundgard et al. | |
| 2017/0037263 A1 | 2/2017 | Iyer et al. | |
| 2017/0183506 A1 | 6/2017 | Romick et al. | |

FOREIGN PATENT DOCUMENTS

WO    2019/083877 A1    5/2019

* cited by examiner

*Primary Examiner* — Irina S Zemel
*Assistant Examiner* — Jeffrey S Lenihan
(74) *Attorney, Agent, or Firm* — Boyle Fredrickson, S.C.

(57) ABSTRACT

The present disclosure provides a process including providing a polyolefin aqueous dispersion having (50) to (90) wt % solids content of dispersion, the polyolefin aqueous dispersion containing solid particles containing a polyolefin including an ethylene-based polymer having a melting temperature from greater than (115)° C. to (140)° C., polyolefin wax, acrylic dispersant; and an aqueous phase including excess acrylic dispersant; adding diluting water to form a diluted polyolefin aqueous dispersion having (5) to less than (50) wt % solids content; collecting the solid particles; washing the solid particles with a washing agent to remove the excess acrylic dispersant; and removing the washing agent to form a powder having a mean volume average particle size from (10) to (300) μm, a sphericity from (0.92) to (1.0), a particle size distribution from (1) to less than (2), a particle density from (98)% to (100)%, and a flow rate in a large funnel from (1) to (5) seconds.

15 Claims, 1 Drawing Sheet

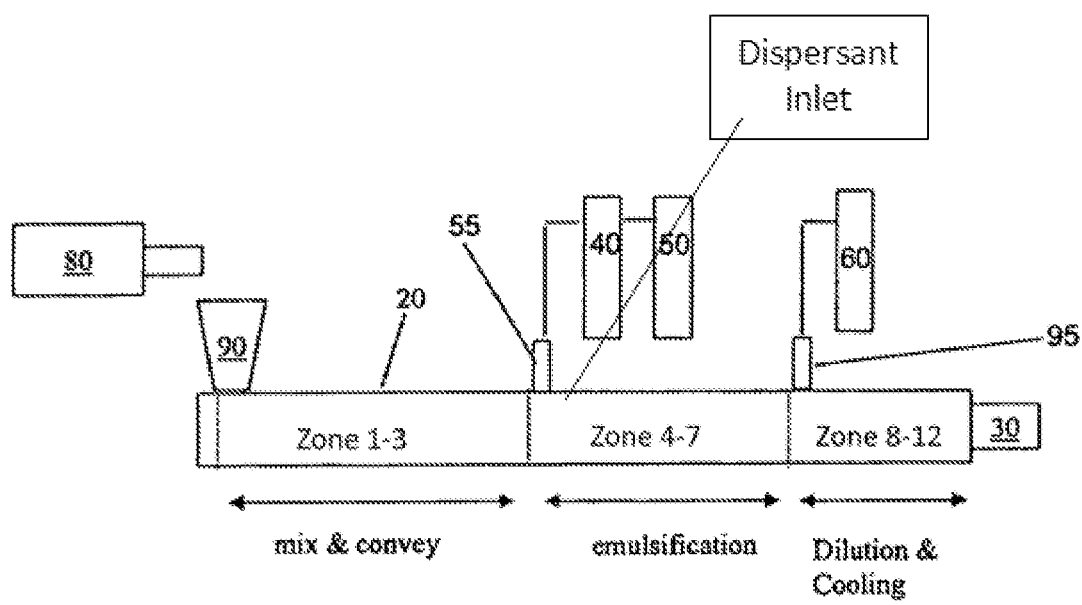

PROCESS FOR FORMING A POWDER

BACKGROUND

The present disclosure relates to a process for forming a powder.

Polyolefin powders having a small mean volume average particle size are useful in 3D-printing techniques such as powder bed fusion, where successive layers of powder are laid down and sintered to form a 3-dimensional end product. Powder bed fusion requires flowable powders to enable easy transport and loading of the powders. Powder bed fusion also requires powder having a small mean volume average particle size. A polyolefin powder having a small mean volume average particle size is conventionally formed in one of three ways: (i) spray drying an aqueous polyolefin dispersion with small particle size to remove water and obtain aggregated dry powder; (ii) coagulating or aggregating a small particle size aqueous polyolefin dispersion and filtering the aggregate to remove water; or (iii) mechanically grinding the polyolefin to the desired size, such as through cryogrinding. When produced via spray drying and/or the coagulating or aggregating process, the resulting powder contains agglomerates with voids that are not fully dense, which deteriorates the mechanical properties of an end product formed from said powder. When produced via mechanical grinding, the resulting powder has a broad particle size distribution and the particles have irregular shapes (compared to spherical shapes).

The art recognizes the need for a process for producing a powder that has a small mean volume average particle size, has a narrow particle size dispersity, is fully dense, and is spherical. The art also recognizes the need for a process for producing a flowable powder.

SUMMARY

The present disclosure provides a process. The process includes (i) providing a polyolefin aqueous dispersion having from 50 wt % to 90 wt % solids content of dispersion, the polyolefin aqueous dispersion containing (a) solid particles containing a polyolefin including an ethylene-based polymer having a melting temperature from greater than 115° C. to 140° C.; a polyolefin wax; and an acrylic dispersant; and (b) an aqueous phase including excess acrylic dispersant; (ii) adding diluting water to the polyolefin aqueous dispersion to form a diluted polyolefin aqueous dispersion having from 5 wt % to less than 50 wt % solids content of dispersion; (iii) collecting the solid particles from the diluted polyolefin aqueous dispersion; (iv) washing the solid particles with a washing agent to remove the excess acrylic dispersant; and (v) removing the washing agent to form a powder, the powder having a mean volume average particle size from 10 μm to 300 μm, a sphericity from 0.92 to 1.0, a particle size distribution from 1 to less than 2, a particle density from 98% to 100%, and a flow rate in a large funnel from 1 sec to 5 sec.

BRIEF DESCRIPTION OF THE DRAWINGS

The FIGURE is a schematic representation of an extruder in accordance with an embodiment of the present disclosure.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The term "alkyl" refers to an organic radical derived from an aliphatic hydrocarbon by deleting one hydrogen atom therefrom. An alkyl group may be a linear, branched, cyclic or a combination thereof. Nonlimiting examples of suitable alkyls include methyl, ethyl, n-propyl, i-propyl, n-butyl, t-butyl, i-butyl (or 2-methylpropyl), etc. In an embodiment, the alkyl has from 1 to 20, or from 1 to 12, or from 1 to 8 carbon atoms.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "agglomerate" is a plurality of individual fine solid particles clumped or otherwise together forming a single mass.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer. Ethylene plastomers/elastomers have a density from 0.870 g/cc to 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

"High density polyethylene" (or "HDPE") is an ethylene homopolymer or an ethylene/α-olefin copolymer with at least one $C_4$-$C_{10}$ α-olefin comonomer, or $C_4$-$C_8$ α-olefin comonomer and a density from 0.940 g/cc, or 0.945 g/cc, or 0.950 g/cc, 0.953 g/cc to 0.955 g/cc, or 0.960 g/cc, or 0.965 g/cc, or 0.970 g/cc, or 0.975 g/cc, or 0.980 g/cc. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution. A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins (available from The Dow Chemical Company), ELITE™ Enhanced Polyethylene Resins (available from The Dow Chemical Company), CONTINUUM™ Bimodal Polyethylene Resins (available from The Dow Chemical Company), LUPOLEN™ (available from LyondellBasell), as well as HDPE products from Borealis, Ineos, and ExxonMobil.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Low density polyethylene" (or "LDPE") consists of ethylene homopolymer, or ethylene/α-olefin copolymer comprising at least one $C_3$-$C_{10}$ α-olefin that has a density from 0.915 g/cc to less than 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer. LLDPE is characterized by little, if any, long chain branching, in contrast to conventional LDPE. LLDPE has a density from 0.910 g/cc to less than 0.940 g/cc. Nonlimiting examples of LLDPE include TUFLIN™ linear low density polyethylene resins (available from The Dow Chemical Company), DOWLEX™ polyethylene resins (available from the Dow Chemical Company), and MARLEX™ polyethylene (available from Chevron Phillips).

"Multi-component ethylene-based copolymer" (or "EPE") comprises units derived from ethylene and units derived from at least one $C_3$-$C_{10}$ α-olefin comonomer, such as described in patent references U.S. Pat. Nos. 6,111,023; 5,677,383; and 6,984,695. EPE resins have a density from 0.905 g/cc to 0.962 g/cc. Nonlimiting examples of EPE resins include ELITE™ enhanced polyethylene (available from The Dow Chemical Company), ELITE AT™ advanced technology resins (available from The Dow Chemical Company), SURPASS™ Polyethylene (PE) Resins (available from Nova Chemicals), and SMART™ (available from SK Chemicals Co.).

An "olefin-based polymer" or "polyolefin" is a polymer that contains more than 50 weight percent polymerized olefin monomer (based on total amount of polymerizable monomers), and optionally, may contain at least one comonomer. A nonlimiting examples of an olefin-based polymer is ethylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer. ULDPE and VLDPE each has a density from 0.885 g/cc to 0.915 g/cc. Nonlimiting examples of ULDPE and VLDPE include ATTANE™ ultra low density polyethylene resins (available from The Dow Chemical Company) and FLEXOMER™ very low density polyethylene resins (available from The Dow Chemical Company).

Test Methods

Acid value (or acid number) is measured in accordance with ASTM D 1386/7. Acid value is a measure of the amount of carboxylic acid present in the final composition. The acid value is the number of milligrams of potassium hydroxide required for the neutralization of free carboxylic acids present in one gram of a substance (e.g., the ethylene-based polymer or dispersant). Units for acid value are mg KOH/g.

D10, D50, and D90 particle size is measured using a Coulter LS 230 Laser Light Scattering Particle Sizer, available from Coulter Corporation. D10 particle size is the particle diameter at which 10% of the powder's mass is composed of particles with a diameter less than this value. D50 particle size is the particle diameter at which 50% of the powder's mass is composed of particles with a diameter less than this value and 50% of the power's mass is composed of particles with a diameter greater than said value. D90 particle size is the particle diameter at which 90% of the powder's mass is composed of particles with a diameter less than this value.

Density is measured in accordance with ASTM D792, Method B. The result is recorded in grams per cubic centimeter (g/cc).

Drop point is measured in accordance with ASTM D3954.

Flow rate through a funnel indicates the flow of the powder and is measured as a function of the time it takes for 50 g powder to flow through a funnel. A large funnel and a small funnel are used. The "large funnel" is a Fisherbrand™ 10-500-2 funnel having a 225 ml capacity, a stem with an inner diameter of 18 mm, and a height of 39.2 mm. The "small funnel" is a Fisherbrand™ 10-500-7 funnel having a 175 ml capacity, a stem with an inner diameter of 3.1 mm, and a height of 36.3 mm.

Interfacial tension is measured using a drop tensiometer on a composition containing 5 wt % dispersant in an aqueous phase that is water against Lucant™ LX001 (a hydrocarbon-based synthetic oil), available from Mitusi Chemicals Inc. Interfacial tension is measured at 60° C.

Mean volume average particle size is measured using a Coulter LS 230 Laser Light Scattering Particle Sizer, available from Coulter Corporation.

Melt index (MI) (12) in g/10 min is measured using ASTM D1238 (190° C./2.16 kg).

Melt flow rate (MFR) in g/10 min is measured using ASTM D1238 (230° C./2.16 kg).

Melt viscosity is measured using a Brookfield Viscometer Model, and a Brookfield RV-DV-II-Pro viscometer spindle 31, at 135° C. for the ethylene-based wax. The sample is poured into the chamber, which is, in turn, inserted into a Brookfield Thermosel, and locked into place. The sample chamber has a notch on the bottom that fits the bottom of the Brookfield Thermosel, to ensure that the chamber is not allowed to turn, when the spindle is inserted and spinning. The sample (approximately 8-10 grams of resin) is heated to the required temperature until the melted sample is one inch below the top of the sample chamber. The viscometer apparatus is lowered, and the spindle submerged into the sample chamber. Lowering was continued, until the brackets on the viscometer align on the Thermosel. The viscometer is turned on, and set to operate at a shear rate, which leads to a torque reading in the range of 40 to 60 percent of the total torque capacity, based on the rpm output of the viscometer. Readings are taken every minute for 15 minutes, or until the values stabilize, at which point, a final reading is recorded.

Particle size distribution is calculated in accordance with Equation A:

$$\text{Particle size distribution} = \frac{(D90 - D10)}{D50}. \qquad \text{Equation A}$$

Differential Scanning Calorimetry (DSC)

Differential Scanning Calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 180° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are extrapolated onset of melting, Tm, and extrapolated onset of crystallization, Tc. Heat of fusion ($H_f$) (in Joules per gram), and the calculated % crystallinity for polyethylene samples using the following Equation: % Crystallinity=(($H_f$)/292 J/g)×100

The heat of fusion ($H_f$) (also known as melt enthalpy) and the peak melting temperature are reported from the second heat curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in Bernhard Wunderlich, *The Basis of Thermal Analysis*, in *Thermal Characterization of Polymeric Materials* 92, 277-278 (Edith A. Turi ed., 2d ed. 1997).

Glass transition temperature, Tg, is determined from the DSC heating curve where half the sample has gained the liquid heat capacity as described in Bernhard Wunderlich, *The Basis of Thermal Analysis*, in *Thermal Characterization of Polymeric Materials* 92, 278-279 (Edith A. Turi ed., 2d ed. 1997). Baselines are drawn from below and above the glass transition region and extrapolated through the Tg region. The temperature at which the sample heat capacity is half-way between these baselines is the Tg.

Particle Density

A LUMiSizer multi-sample analytical centrifuge is used to screen emulsion stability. Each sample is spun through an array of IR lasers and detectors which translate the transmission values into a 2-dimension profile. The progression of the transmission profiles relates to the terminal velocity V, of a dispersed droplet as defined by Stokes law, Equation C:

$$V = \frac{2r_d^2 g(\rho_d - \rho_f)}{9\eta},\quad \text{Equation C}$$

where $r_d$ is the droplet radius, g is acceleration of the droplet, $\rho_d$ is droplet density, $\rho_f$ fluid medium density, and $\eta$ is the dynamic viscosity of the fluid. Equation D defines the relative acceleration factor of the LUMiSizer, where r is the position of the sample in mm and rpm is the rotor speed in revolutions per minute. This acceleration of gravity is multiplied by this factor and substituted into Equation C.

$$g = \text{Acceleration Factor} = 1.18*r*\left(\frac{rpm}{1000}\right)^2 \quad \text{Equation D}$$

With a known particle diameter, Equation C can determine the particle density of polymeric particles. For example, when a LUMiSizer determines a particle velocity of 12.7 μm/s and an acceleration force of 2.45E9 μm/s², literature values for the density and viscosity of water at 20° C. are used (1E-12 g/μm³ and 1E-6 g/μm-s, respectively), and multiple light scattering determines an average particle size of 37 μm, plugging these values into Equation C and solving for density yields a density of 0.96 g/cm³. With the expected density of these particles being 0.975 g/cm³, this indicates there are very few to no voids, with the particle being 98.4% of the expected density.

Sphericity

Scanning electron microscopy images are taken to characterize the particles. Images of smooth spheroids exhibit no visible voids up to 10,000× magnification. "Sphericity" (ψ) of a particle is the ratio of the surface area of a sphere (with the same volume as the given particle) to the surface area of the particle. For a spheroid, sphericity (ψ) is calculated in accordance with Equation B, where V is volume and A is surface area, and is obtained by measuring the length of the axes of the 2D projection of the spherical particle, approximating it as a spheroid, and solving the equation where a and b are the semi-major and semi-minor axes of the spheroid respectively.

$$\Psi = \frac{\pi^{\frac{1}{2}}(6V_p)^{\frac{2}{3}}}{A_p} = \frac{2\sqrt[3]{ab^2}}{a + \frac{b^3}{\sqrt{a^2 \cdot b^2}}\ln\left(\frac{n+\sqrt{a^2-b^2}}{b}\right)}. \quad \text{Equation B.}$$

DETAILED DESCRIPTION

The present disclosure relates to a process. The process includes (i) providing a polyolefin aqueous dispersion having from 50 wt % to 90 wt % solids content of dispersion, the polyolefin aqueous dispersion containing (a) solid particles containing a polyolefin including an ethylene-based polymer having a melting temperature from greater than 115° C. to 140° C.; a polyolefin wax; an acrylic dispersant; (b) an aqueous phase including excess acrylic dispersant; (ii) adding diluting water to the polyolefin aqueous dispersion to form a diluted polyolefin aqueous dispersion having from 5 wt % to less than 50 wt % solids content of dispersion; (iii) collecting the solid particles from the diluted polyolefin aqueous dispersion; (iv) washing the solid particles with a washing agent to remove the excess acrylic dispersant; and (v) removing the washing agent to form a powder, the powder having a mean volume average particle size from 10 μm to 300 μm, a sphericity from 0.92 to 1.0, a particle size distribution from 1 to less than 2, a particle density from 98% to 100%, and a flow rate in a large funnel from 1 sec to 5 sec.

i. Providing a Polyolefin Aqueous Dispersion

The process includes the step of (i) providing a polyolefin aqueous dispersion having from 50 wt % to 90 wt % solids content of dispersion, the polyolefin aqueous dispersion containing: (a) solid particles containing a polyolefin including an ethylene-based polymer having a melting temperature from greater than 115° C. to 140° C.; a polyolefin wax; an acrylic dispersant; optionally, an additive; and (b) an aqueous phase including excess acrylic dispersant.

a. Solid Particles

The process includes providing a polyolefin aqueous dispersion containing solid particles. The solid particles contain (1) a polyolefin including an ethylene-based polymer having a melting temperature from greater than 115° C. to 140° C.; (2) a polyolefin wax; (3) an acrylic dispersant; and (4) optionally, an additive.

1. Polyolefin

The process includes providing a polyolefin aqueous dispersion containing solid particles including a polyolefin containing an ethylene-based polymer having a melting temperature from greater than 115° C. to 140° C.

Nonlimiting examples of suitable ethylene-based polymer include LDPE; LLDPE; ULDPE; VLDPE; EPE; ethylene/α-olefin multi-block copolymers; substantially linear, or linear, plastomers/elastomers; HDPE; and combinations thereof.

The term "ethylene/α-olefin multi-block copolymer" refers to an ethylene/C4-C8 α-olefin multi-block copolymer consisting of ethylene and one copolymerizable C4-C8 α-olefin comonomer in polymerized form (and optional additives), the polymer characterized by multiple blocks or segments of two polymerized monomer units differing in chemical or physical properties, the blocks joined (or covalently bonded) in a linear manner, that is, a polymer comprising chemically differentiated units which are joined end-to-end with respect to polymerized ethylenic functionality. Ethylene/α-olefin multi-block copolymer includes block copolymer with two blocks (di-block) and more than two blocks (multi-block). The C4-C8 α-olefin is selected from butene, hexene, and octene. The ethylene/α-olefin multi-block copolymer is void of, or otherwise excludes, styrene (i.e., is styrene-free), and/or vinyl aromatic monomer, and/or conjugated diene. When referring to amounts of "ethylene" or "comonomer" in the copolymer, it is understood that this refers to polymerized units thereof. In some embodiments, the ethylene/α-olefin multi-block copolymer can be represented by the following formula: (AB)n; where n is at least 1, preferably an integer greater than 1, such as 2, 3, 4, 5, 10, 15, 20, 30, 40, 50, 60, 70, 80, 90, 100, or higher, "A" represents a hard block or segment, and "B" represents a soft block or segment. The As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows: AAA-AA-BBB-BB. In an embodiment, the ethylene/α-olefin multi-block copolymer does not have a third type of block, which comprises different comonomer(s). In another embodiment, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole ethylene/α-olefin multi-block copolymer, i.e., ethylene comprises at least 50 wt % of the whole ethylene/α-olefin multi-block copolymer. More preferably, ethylene comprises at least 60 wt %, at least 70 wt %, or at least 80 wt %, with the substantial remainder of the whole ethylene/α-olefin multi-block copolymer comprising the $C_4$-$C_8$ α-olefin comonomer. In an embodiment, the ethylene/α-olefin multi-block copolymer contains from 50 wt %, or 60 wt %, or 65 wt % to 80 wt %, or 85 wt %, or 90 wt % ethylene. For many ethylene/octene multi-block copolymers, the composition comprises an ethylene content greater than 80 wt % of the whole ethylene/octene multi-block copolymer and an octene content of from 10 wt % to 15 wt %, or from 15 wt % to 20 wt % of the whole multi-block copolymer.

The ethylene/α-olefin multi-block copolymer includes various amounts of "hard" segments and "soft" segments. "Hard" segments are blocks of polymerized units in which ethylene is present in an amount greater than 90 wt %, or 95 wt %, or greater than 95 wt %, or greater than 98 wt %, based on the weight of the polymer, up to 100 wt %. In other words, the comonomer content (content of monomers other than ethylene) in the hard segments is less than 10 wt %, or 5 wt %, or less than 5 wt %, or less than 2 wt %, based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 wt %, or greater than 8 wt %, greater than 10 wt %, or greater than 15 wt %, based on the weight of the polymer. In an embodiment, the comonomer content in the soft segments is greater than 20 wt %, greater than 25 wt %, greater than 30 wt %, greater than 35 wt %, greater than 40 wt %, greater than 45 wt %, greater than 50 wt %, or greater than 60 wt % and can be up to 100 wt %.

The soft segments can be present in an ethylene/α-olefin multi-block copolymer from 1 wt %, or 5 wt %, or 10 wt %, or 15 wt %, or 20 wt %, or 25 wt %, or 30 wt %, or 35 wt %, or 40 wt %, or 45 wt % to 55 wt %, or 60 wt %, or 65 wt %, or 70 wt %, or 75 wt %, or 80 wt %, or 85 wt %, or 90 wt %, or 95 wt %, or 99 wt % of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, the disclosure of which is incorporated by reference herein in its entirety. In particular, hard and soft segment weight percentages and comonomer content may be determined as described in column 57 to column 63 of U.S. Pat. No. 7,608,668.

The ethylene/α-olefin multi-block copolymer comprises two or more chemically distinct regions or segments (referred to as "blocks") joined (or covalently bonded) in a linear manner, that is, it contains chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E*(1998) 57 (6), pp. 6902-6912, and Dobrynin, *J. Chem. Phys.* (1997) 107 (21), pp 9234-9238.

In an embodiment, the present ethylene/α-olefin multi-block copolymer possesses a most probable distribution of block lengths.

Nonlimiting examples of suitable ethylene/α-olefin multi-block copolymer are disclosed in U.S. Pat. No. 7,608,668, the entire content of which is incorporated by reference herein.

In an embodiment, the ethylene/α-olefin multi-block copolymer has hard segments and soft segments, is styrene-free, consists of only (i) ethylene and (ii) a $C_4$-$C_8$ α-olefin (and optional additives), and is defined as having a Mw/Mn from 1.7 to 3.5, at least one melting point, Tm, in degrees Celsius, and a density, d, in grams/cubic centimeter, wherein the numerical values of Tm and d correspond to the relationship: $Tm > -2002.9 + 4538.5(d) - 2422.2(d)^2$, where the density, d, is from 0.850 g/cc, or 0.860 g/cc, or 0.870 g/cc to 0.875 g/cc, or 0.877 g/cc, or 0.880 g/cc, or 0.890 g/cc; and the melting point, Tm, is from 110° C., or 115° C., or 120° C. to 122° C., or 125° C., or 130° C., or 135° C.

In an embodiment, the ethylene/α-olefin multi-block copolymer is an ethylene/1-octene multi-block copolymer (consisting only of ethylene and octene comonomer) and has one, some, or all of the following properties: (i) a Mw/Mn from 1.7, or 1.8 to 2.2, or 2.5, or 3.5; and/or (ii) a density from 0.850 g/cc, or 0.860 g/cc, or 0.865 g/cc, or 0.870 g/cc to 0.877 g/cc, or 0.880 g/cc, or 0.900 g/cc; and/or (iii) a melting point, Tm, from 115° C., or 118° C., or 119° C., or 120° C. to 120° C., or 122° C., or 125° C.; and/or (iv) a melt index (MI) from 0.1 g/10 min, or 0.5 g/10 min to 1.0 g/10 min, or 2.0 g/10 min, or 5 g/10 min, or 10 g/10 min, or 50 g/10 min; and/or (v) 50-85 wt % soft segment and 40-15 wt % hard segment; and/or (vi) from 10 mol %, or 13 mol %, or 14 mol %, or 15 mol % to 16 mol %, or 17 mol %, or 18 mol %, or 19 mol %, or 20 mol % $C_4$-$C_{12}$ α-olefin in the soft segment; and/or (vii) from 0.5 mol %, or 1.0 mol %, or 2.0 mol %, or 3.0 mol % to 4.0 mol %, or 5 mol %, or 6 mol %, or 7 mol %, or 9 mol % octene in the hard segment; and/or (viii) an elastic recovery (Re) from 50%, or 60% to 70%, or 80%, or 90%, at 300% $min^{-1}$ deformation rate at 21° C. as measured in accordance with ASTM D 1708; and/or (ix) a polydisperse distribution of blocks and a polydisperse distribution of block sizes.

In an embodiment, the ethylene/α-olefin multi-block copolymer is an ethylene/octene multi-block copolymer. The ethylene/octene multi-block copolymer is sold under the tradename INFUSE™, available from The Dow Chemical Company, Midland, Mich., USA.

In an embodiment, the ethylene-based polymer is selected from HDPE, LDPE, and ethylene/α-olefin multi-block copolymer. The ethylene-based polymer has one, some, or all of the following properties: (i) a melt index from 0.1 g/10 min, or 1.0 g/10 min, or 2.0 g/10 min, or 4.0 g/10 min to 9.0 g/10 min, or 10.0 g/10 min, or 15 g/10 min; and/or (ii) a melting temperature from 95° C., 96° C., or 115° C., or 118° C., or 120° C., or 122° C. to 133° C., or 135° C., or 140° C.; and/or (iii) a density from 0.860 g/cc, or 0.870 g/cc, or 0.875 g/cc, or 0.877 g/cc to 0.900 g/cc, or 0.955 g/cc, or 0.965 g/cc, or 0.970 g/cc, or 0.975 g/cc.

In an embodiment, the polyolefin, and further the ethylene-based polymer, has a melt index from 0.1 g/10 min, or 1.0 g/10 min, or 2.0 g/10 min, or 4.0 g/10 min to 9.0 g/10 min, or 10.0 g/10 min, or 35 g/10 min, or 40 g/10 min, or 50 g/10 min, or 100 g/10 min, or 500 g/10 min, or 1,000 g/10 min.

In an embodiment, the polyolefin, and further the ethylene-based polymer, has a melting temperature from greater than 115° C., 116° C., or 119° C., or 120° C., or 122° C. to 130° C., or 135° C., or 140° C.

In an embodiment, the polyolefin, and further the ethylene-based polymer, has a density from 0.800 g/cc, or 0.850 g/cc, or 0.866 g/cc, or 0.870 g/cc to 0.875 g/cc, or 0.900 g/cc, or 0.955 g/cc, or 0.965 g/cc, or 0.970 g/cc, or 0.975 g/cc, or 0.980 g/cc, or 0.990 g/cc, or 0.995 g/cc, or 1.00 g/cc.

In an embodiment, the polyolefin contains a blend of two or more ethylene-based polymers. At least one of the ethylene-based polymers has a melting temperature from greater than 115° C. to 140° C.

In an embodiment, the polyolefin contains, consists essentially of, or consists of, ethylene-based polymer having a melting temperature greater than 115° C., or from 116° C. to 140° C.

The ethylene-based polymer may comprise two or more embodiments discussed herein.

The polyolefin may comprise two or more embodiments discussed herein.

2. Polyolefin Wax

The process includes providing a polyolefin aqueous dispersion containing solid particles including a polyolefin wax. A nonliminiting example of a suitable polyolefin wax is an ethylene-based wax.

In an embodiment, the polyolefin wax an ethylene-based wax. An "ethylene-based wax" is an ethylene-based polymer having a melt viscosity, at 140° C., that is less than, or equal to (≤) 1,000 mPa·s, or ≤500 mPa·s. The ethylene-based wax is composed of a majority amount (i.e., greater than 50 wt %) of polymerized ethylene monomer and optional α-olefin comonomer. In an embodiment, the ethylene-based wax is selected from a high density, low molecular weight polyethylene wax; a by-product polyethylene wax; a Fischer-Tropsch wax containing an ethylene-based polymer; oxidized Fischer-Tropsch waxes containing an ethylene-based polymer; functionalized polyethylene waxes; and combinations thereof.

In an embodiment, the ethylene-based wax has one, some, or all of the following properties: (i) a density from 0.900 g/cc, or 0.910 g/cc, or 0.920 g/cc, or 0.930 g/cc to 0.940 g/cc, or 0.950 g/cc, or 0.960 g/cc, or 0.970 g/cc, or 0.980 g/cc, or 0.990 g/cc, or 0.995 g/cc; and/or (ii) a melt viscosity, at 140° C., from 50 mPa·s, or 60 mPa·s to 65 mPa·s, or 70 mPa·s, or 75 mPa·s, or 80 mPa·s, or 90 mPa·s, or 100 mPa·s, or 200 mPa·s, or 300 mPa·s, or 400 mPa·s, or 500 mPa·s; and/or (iii) an acid value from 0 mg KOH/g, or 10 mg KOH/g, or 20 mg KOH/g, or 30 mg KOH/g, or 40 mg KOH/g to 45 mg KOH/g, or 50 mg KOH/g; and/or (iv) a drop point from 110° C., or 115° C., or 120° C. to 123° C., or 125° C., or 130° C., or 140° C.

In an embodiment, the ethylene-based wax is functionalized. A nonlimiting example of a suitable functionalized ethylene-based wax is a carboxylic-functionalized ethylene-based wax. A "carboxylic-functionalized ethylene-based wax" is an ethylene-based wax with a carboxylic acid-based moiety bonded to the ethylene-based polymer chain (for example, a carboxylic acid-based moiety grafted to the ethylene-based polymer chain). A "carboxylic acid-based moiety" is a compound that contains a carboxyl group (—COOH) or a derivative thereof. Nonlimiting examples of suitable carboxylic acid-based moieties include carboxylic acids and carboxylic acid anhydrides. Nonlimiting examples of suitable carboxylic acids and carboxylic acid anhydrides that can be grafted onto the ethylene-based polymer include maleic acid, fumaric acid, itaconic acid, acrylic acid, methacrylic acid, crotonic acid, maleic anhydride, and itaconic anhydride. In an embodiment, the carboxylic-functionalized ethylene-based wax is a maleic-anhydride-functionalized ethylene-based wax. A nonlimiting example of a suitable maleic-anhydride-grafted ethylene-based wax is Licocene™ PE MA 4351, available from Clariant.

The ethylene-based wax may comprise two or more embodiments discussed herein.

The polyolefin wax may comprise two or more embodiments discussed herein.

3. Acrylic Dispersant

The process includes providing a polyolefin aqueous dispersion containing solid particles including an acrylic dispersant.

An "acrylic dispersant" is an acrylic-monomer containing material that promotes the formation and stabilization of a dispersion. Nonlimiting examples of suitable acrylic monomer include alkyl (meth)acrylates, ethyl hexylacrylate (2-EHA), and combinations thereof. Nonlimiting examples of suitable acrylic monomer include nonionic copolymerized monoethylenically unsaturated monomers such as (meth)acrylic ester monomer including methyl (meth)acrylate (MMA), ethyl (meth)acrylate, butyl (meth)acrylate, 2-ethylhexyl (meth)acrylate, decyl (meth)acrylate, hydroxyethyl (meth)acrylate, hydroxypropyl (meth)acrylate, ureidofunctional (meth)acrylates and acetoacetates, acrylamides, acetamides or cyanoacetates of (meth)acrylic acid; styrene or substituted styrenes; vinyl toluene; monoethylenically unsaturated acetophenone or benzophenone derivatives; vinyl acetate or other vinyl esters; vinyl monomers such as vinyl chloride, vinylidene chloride, N-vinyl pyrollidone; and (meth)acrylonitrile. The term "(meth)" followed by another term such as (meth)acrylate refers to both acrylates and methacrylates.

In an embodiment, the acrylic dispersant contains at least one acrylic monomer and a carboxylic acid comonomer. Nonlimiting examples of suitable carboxylic acid comonomers include acrylic acid, methacrylic acid (MAA), crotonic acid, itaconic acid, fumaric acid, maleic acid, monomethyl itaconate, monomethyl fumarate, monobutyl fumarate, and maleic anhydride. In an embodiment, the acrylic dispersant is an alkyl (meth)acrylate/carboxylic acid interpolymer. In a further embodiment, the acrylic dispersant is a 2-EHA/alkyl (meth)acrylate/carboxylic acid terpolymer.

In an embodiment, the acrylic dispersant is ethylene-free.

In an embodiment, the acrylic dispersant is an ethylhexyl acrylate/methylmethacrylate (MMA)/methacrylic acid terpolymer (or a 2-ethylhexyl acrylate/MMA/methacrylic acid terpolymer). In a further embodiment, the ethylhexyl acrylate/MMA/methacrylic acid terpolymer contains from 5 wt %, or 10 wt % to 74 wt %, or 75 wt %, or 80 wt % units derived from 2-EHA; from 1 wt %, or 2 wt % to 66 wt %, or 70 wt % units derived from MMA; and from 15 wt %, or 19 wt % to 24 wt %, or 25 wt % units derived from MAA. In an embodiment, the ethylhexyl acrylate/MMA/methacrylic acid terpolymer has one, some, or all of the following properties: (i) a glass transition temperature, Tg, from −60° C., or −50° C., or −40° C., or −30° C., or −20° C., or −10° C., or 0° C., to 5° C., or 10° C., or 50° C., or 90° C., or 100° C.; and/or (ii) a viscosity from 70 mPa·s, or 80 mPa·s to 90 mPa·s, or 100 mPa·s, or 150 mPa·s, or 190 mPa·s, or 200 mPa·s; and/or (iii) an acid value from 100 mg KOH/g, or 110 mg KOH/g, or 140 mg KOH/g, or 150 mg KOH/g to 155 mg KOH/g, or 160 mg KOH/g, or 170 mg KOH/g; and/or (iv) a pH from 4.0, or 4.4 to 4.5, or 5.0, or 6.0, or 7.0.

In an embodiment, the acrylic dispersant is a liquid at room temperature (23° C.).

In an embodiment, the acrylic dispersant is a solid at room temperature (23° C.). The solid acrylic dispersant is in a dried form when it is provided into the dispersion.

The acrylic dispersant may comprise two or more embodiments discussed herein.

4. Optional Additive

In an embodiment, the process includes providing a polyolefin aqueous dispersion containing solid particles including an optional additive.

A nonlimiting example of a suitable additive is a base. The base neutralizes the dispersant to reduce the acid value of the dispersant by from 100% to 140%. Nonlimiting examples of suitable bases include alkaline metals and alkaline earth metals such as sodium, potassium, calcium, strontium, barium; inorganic amines such as hydroxylamine or hydrazine; organic amines such as methylamine, ethylamine, ethanolamine, cyclohexylamine, tetramethylammonium hydroxide; oxide, hydroxide, and hydride of alkaline metals and alkaline earth metals such as sodium oxide, sodium peroxide, potassium oxide, potassium peroxide, calcium oxide, strontium oxide, barium oxide, sodium hydroxide, potassium hydroxide (KOH), calcium hydroxide, strontium hydroxide, barium hydroxide, sodium hydride, potassium hydride, calcium hydride; and weak acid salts of alkaline metals and alkaline earth metals such as sodium carbonate, potassium carbonate, sodium hydrogencarbonate, potassium hydrogencarbonate, calcium hydrogencarbonate, sodium acetate, potassium acetate, calcium acetate; dimethylethanolamine (DMEA); or ammonium hydroxide. In an embodiment, the base is selected from KOH, DMEA, and combinations thereof.

The additive may comprise two or more embodiments discussed herein.

The solid particles may comprise two or more embodiments discussed herein.

b. Aqueous Phase

The process includes providing a polyolefin aqueous dispersion containing (b) an aqueous phase including excess acrylic dispersant.

The "excess acrylic dispersant" is free acrylic dispersant remaining in the polyolefin aqueous dispersion following melt blending, such as extrusion. The excess acrylic dispersant is the same acrylic dispersant present in the solid particles.

The aqueous phase includes water. A nonlimiting example of a suitable water is deionized (DI) water.

The aqueous phase may comprise two or more embodiments discussed herein.

In an embodiment, the polyolefin aqueous dispersion is produced in accordance with U.S. Patent Application No. 62/576,863, filed 25 Oct. 2017, the entire contents of which are hereby incorporated by reference, which discloses a polyolefin aqueous dispersion produced in an extruder. Nonlimiting examples of suitable extruders include single-screw extruders and multi-screw extruders (such as twin-screw extruders). The extruder may be equipped with a first material-supplying inlet and a second material-supplying inlet, and further third and fourth material-supplying inlets in this order from the upper stream to the downstream along the flow direction of material to be kneaded. Further, a vacuum vent may be included at an optional position of the extruder. In an embodiment, the polyolefin aqueous dispersion is first diluted to contain from 1 wt %, or 3 wt %, or 5 wt %, or 10 wt %, or 50 wt % to 50 wt %, or 60 wt %, or 90 wt % of the aqueous phase, and is then subsequently diluted to contain from greater than 50 wt %, or 55 wt %, or 60 wt % to 70 wt %, or 75 wt %, or 80 wt %, or 85 wt %, or 90 wt %, or 95 wt % of the aqueous phase, based on the total weight of the polyolefin aqueous dispersion.

The FIGURE schematically illustrates a nonlimiting example of a suitable extrusion apparatus. An extruder 20, such as twin screw extruder, is coupled to a back pressure regulator, melt pump, or gear pump, and an outlet 30. In an embodiment, the apparatus further includes a base reservoir 40 and an initial water reservoir 50, each of which includes a pump (not shown). Desired amounts of base and initial water are provided from the base reservoir 40 and the initial water reservoir 50, respectively. Any suitable pump may be used, but in some embodiments a pump that provides a flow of about 150 cc/min at a pressure of 240 bar may be used to provide the base and the initial water to the extruder 20. In another embodiment, a liquid injection pump provides a flow of 300 cc/min at 200 bar or 600 cc/min at 133 bar. In another embodiment, the base and the initial water are preheated in a preheater.

The polyolefin, in the form of pellets, powder, or flakes, is fed from the feeder 80 to an inlet 90 of the extruder, where the polyolefin is melted or compounded at a temperature greater than the melting temperature of the polyolefin, such as from 100° C., or 110° C., or 120° C., or 130° C., or 140° C. to 150° C., or 160° C., or 170° C., or 180° C., or 190° C., or 200° C. In an embodiment, the dispersant and the polyolefin wax are added to the polyolefin through an opening along with the polyolefin. In another embodiment, the dispersant and the polyolefin wax each is added separately to the twin screw extruder 20. The melted polyolefin is then delivered from the mix and convey zone to an emulsification zone of the extruder where the initial amount of water (the (b) aqueous phase) and base from the reservoirs 40 and 50 is added through inlet 55. In an embodiment, the dispersant may be added additionally or exclusively to the water stream. In an embodiment, the emulsified mixture is further diluted with additional water via inlet 95 from reservoir 60 in a dilution and cooling zone of the extruder 20. Typically, the dispersion is diluted to at least 30 wt % water in the cooling zone. The diluted mixture may be diluted any number of times until the desired dilution level is achieved.

A nonlimiting example of suitable melt blending in an extruder is the extruder-based mechanical dispersion process disclosed in U.S. Pat. No. 7,763,676, the entire contents of which are hereby incorporated by reference. The extruder-based mechanical dispersion process imparts high shear at a shear rate from 10 $s^{-1}$ to 10,000 $s^{-1}$ on the polyolefin/aqueous phase/polyolefin wax mixture to facilitate a water continuous system with small polymer particles in the presence of a dispersant that reduces the interfacial tension between the polyolefin and (b) the aqueous phase. A high solids content polyolefin aqueous dispersion is formed in the emulsification zone of the extruder, also known as a high internal phase emulsion (HIPE) zone, which is then gradually diluted to the desired solids concentration, as the HIPE progresses from the emulsification zone to the first and second dilution zones. In an embodiment, the extruder is operated using a continuous extruder-based mechanical dispersion process such as the BLUEWAVE™ process of The Dow Chemical Company.

In an embodiment, the polyolefin aqueous dispersion contains: (i) from 50 wt %, or 60 wt %, or 70 wt % to 90 wt %, or 95 wt % of the polyolefin; (ii) from 0 wt %, or 1 wt %, or 5 wt % to 15 wt %, or 20 wt % of the polyolefin wax; (iii) from 1 wt %, or 2 wt %, or 5 wt % to 15 wt %, or 20 wt %, or 40 wt % of the dispersant; and (iv) from 0 wt %, or 0.05 wt % to 2 wt %, or 5 wt % additive, based on the total weight of (i) the polyolefin, (ii) the polyolefin wax, (iii) the dispersant, and (iv) the additive.

It is understood that the sum of the components in each of the polyolefin aqueous dispersions disclosed herein, including the foregoing polyolefin aqueous dispersion, yields 100 wt %.

In an embodiment, the process includes providing a polyolefin aqueous dispersion having an interfacial tension from 0.1 dynes/cm to 25 dynes/cm. "Interfacial tension" is the force that holds together the polyolefin and the aqueous phase. Not wishing to be bound by any particular theory, it is believed the presence of an acrylic dispersant reduces the interfacial tension between the polyolefin and the aqueous phase.

In an embodiment, the process includes the step of providing a polyolefin aqueous dispersion having an interfacial tension from 0.1 dynes/cm, or 5.0 dynes/cm, or 6.0 dynes/cm, or 6.5 dynes/cm, or 6.9 dynes/cm to 7.0 dynes/cm, or 10.0 dynes/cm, or 19.0 dynes/cm, or 20.0 dynes/cm, or 25 dynes/cm.

The polyolefin aqueous dispersion has from 50 wt % to 90 wt % solids content of dispersion. The "solids content" is the total combined weight of the (i) polyolefin, (ii) polyolefin wax, (iii) dispersant, and (iv) optional additive, based on the total weight of the polyolefin aqueous dispersion including (b) the aqueous phase. In other words, the polyolefin aqueous dispersion with a solids content of 50 wt % to 90 wt % contains a reciprocal amount of (b) aqueous phase, or from 10 wt % to 50 wt % aqueous phase, based on the total weight of the polyolefin aqueous dispersion. In an embodiment, the polyolefin aqueous dispersion has a solids content from 50 wt % to 60 wt %, or 80 wt %, or 90 wt %.

In an embodiment, during melt blending and in the emulsification zone of the extruder, the polyolefin aqueous dispersion has a solids content from 50 wt %, or 55 wt %, or 60 wt % to 70 wt %, or 75 wt %, or 80 wt %, or 85 wt %, or 90 wt %; and a reciprocal amount of (b) aqueous phase, or from 10 wt %, or 15 wt %, or 20 wt %, or 25 wt %, or 30 wt % to 40 wt %, or 45 wt %, or 50 wt % (b) aqueous phase, based on the total weight of the polyolefin aqueous dispersion.

In an embodiment, the polyolefin aqueous dispersion is a stable dispersion. A "stable dispersion" is an emulsion in which solid particles are uniformly suspended in a continuous aqueous phase. A stable dispersion excludes materials exiting the extruder in the form of strings or as caked material that cannot be diluted in an aqueous phase.

The providing a polyolefin aqueous dispersion step may comprise two or more embodiments discussed herein.

ii. Adding Diluting Water

The present process includes the step of adding diluting water to the polyolefin aqueous dispersion to form a diluted polyolefin aqueous dispersion having from 5 wt % to less than 50 wt % solids content of dispersion. A nonlimiting example of a suitable water is DI water.

In an embodiment, the step of adding diluting water to the polyolefin aqueous dispersion occurs in the dilution zone of the extruder. In an embodiment, after exiting the dilution zone of the extruder, the diluted polyolefin aqueous dispersion has a solids content from 5 wt %, or 15 wt %, or 30 wt %, or 35 wt %, or 40 wt % to 45 wt %, or less than 50 wt; and a reciprocal amount of (b) aqueous phase, or from greater than 50 wt %, or 55 wt % to 60 wt %, or 65 wt %, or 70 wt %, or 85 wt %, or 95 wt % (b) aqueous phase, based on the total weight of the diluted polyolefin aqueous dispersion.

In an embodiment, the step of adding diluting water to the polyolefin aqueous dispersion occurs after the polyolefin aqueous dispersion exits the extruder. In an embodiment, after exiting the extruder, water is added to the polyolefin aqueous dispersion to form a diluted polyolefin aqueous dispersion having a solids content from 5 wt %, or 15 wt %, or 30 wt %, or 35 wt %, or 40 wt % to 50 wt %, or 55 wt %, or 60 wt %; and a reciprocal amount of (b) aqueous phase, or from 40 wt %, or 45 wt %, or 50 wt % to 60 wt %, or 65 wt %, or 70 wt %, or 85 wt %, or 95 wt % (b) aqueous phase, based on the total weight of the diluted polyolefin aqueous dispersion.

In an embodiment, the step of adding diluting water to the polyolefin aqueous dispersion occurs in the dilution zone of the extruder and after the polyolefin aqueous dispersion exits the extruder.

The adding diluting water step may comprise two or more embodiments discussed herein.

iii. Collecting Solid Particles

The present process includes the step of collecting solid particles from the diluted polyolefin aqueous dispersion.

In an embodiment, the collecting step comprises skimming the solid particles from a top portion of the diluted polyolefin aqueous dispersion. When the diluted polyolefin aqueous dispersion is allowed to sit at room temperature (23° C.) for a time, such as at least 1 hour, the solid particles float to the top of the diluted polyolefin aqueous dispersion and form a layer, which may be skinned from the top portion of the diluted polyolefin aqueous dispersion to collect the solid particles. In an embodiment, the solid particles that float to the top of the diluted polyolefin aqueous dispersion are solid particles having a mean volume average particle size from 10 µm to 300 µm. Particles having a mean volume average particle size of less than 10 µm are kinetically slower to float to the top—instead, they remain suspended in the polyolefin aqueous dispersion.

In an embodiment, the collecting step comprises filtering the diluted polyolefin aqueous dispersion through a filtering device. A nonlimiting example of a filtering device is a vacuum filter. In an embodiment, the filtering device collects the solid particles having a mean volume average particle size from 10 µm to 300 µm.

The collecting solid particles step may comprise two or more embodiments discussed herein.

iv. Washing the Solid Particles with a Washing Agent

The present process includes the step of washing the solid particles with a washing agent.

A nonlimiting example of a suitable washing agent is a polar solvent. A "polar solvent" is a solvent in which there is a either a permanent separation of positive and negative charges in the solvent molecules, or the centers of positive and negative charges do not coincide. A polar solvent has a polar plus hydrogen bonding portion greater than 0, as opposed to hydrocarbon solvents in which the polar plus hydrogen bonding portion is 0 or close to 0. Nonlimiting examples of polar solvents include water, alcohols, ketones and esters. In an embodiment, the polar solvent is a ketone. A nonlimiting example of a ketone polar solvent is acetone. In an embodiment, the polar solvent is an ester. Nonlimiting examples of ester polar solvents include butyl acetate and ethyl acetate. In an embodiment, the polar solvent is water. A nonlimiting example of a suitable water is DI water.

The washing removes the excess acrylic dispersant from the solid particles.

1. Washing with Water

In an embodiment, washing the solid particles includes washing the solid particles with water. Washing the solid particles with water includes dispersing the solid particles in water. Then, the dispersion is filtered, such as with vacuum filtration, to collect the washed solid particles. In an embodiment, the washing the solid particles with water step is repeated at least twice, or at least three times.

The washing the solid particles with water step may comprise two or more embodiments discussed herein.

2. Washing with Acetone

In an embodiment, the washing solid particles includes washing the solid particles with acetone.

In an embodiment, washing the solid particles with acetone includes dispersing the solid particles in acetone and allowing the dispersion to sit at room temperature (23° C.) for a time, such as at least 1 hour. The solid particles float to the top of the dispersion and form a layer, which may be skinned from the top portion of the dispersion to collect the solid particles.

In an embodiment, washing the solid particles with acetone includes placing the solid particles in a filter bag, such as a 200 µm pore size filter bag, and rinsing the bag containing the solid particles with the acetone. The solid particles are then collected from the filter bag.

In an embodiment, washing the solid particles with acetone includes dispersing the solid particles in solvent and allowing the dispersion to sit at room temperature (23° C.) for a time, such as at least 1 hour. The solid particles float to the top of the dispersion and form a layer, which may be skinned from the top portion of the dispersion to collect the solid particles. Then, the solid particles are placed in a filter bag, such as a 200 µm pore size filter bag, and the bag containing the solid particles is rinsed with the acetone. The solid particles are then collected from the filter bag.

In an embodiment, the washing the solid particles with acetone step is repeated once, or at least twice, or at least three times.

In an embodiment, the washing the solid particles with a washing agent includes first washing the solid particles with a washing agent that is water, and second washing the solid particles with a washing agent that is acetone.

In an embodiment, the washing the solid particles with acetone step is performed after the washing the solid particles with water step, and before the solid particles are dry, or are substantially dry.

The washing the solid particles with a washing agent step may comprise two or more embodiments discussed herein.

v. Removing the Washing Agent

The present process includes the step of removing the washing agent to form a powder, the powder having a mean volume average particle size from 10 µm to 300 µm, a sphericity from 0.92 to 1.0, a particle size distribution from 1 to less than 2, a particle density from 98% to 100%, and a flow rate in a large funnel from 1 sec to 5 sec.

In an embodiment, all, or substantially all, of the washing agent is removed. In another embodiment, less than 100% of the washing agent is removed such that the powder is not fully dry before being coated with a flow aid.

In an embodiment, the step of removing the washing agent includes allowing the solid particles to sit at room temperature (23° C.) for a time, such as at least 30 minutes, or at least 1 hour, or from 30 minutes, or 1 hour to 36 hours, or 40 hours, to form a powder.

In an embodiment, the step of removing the washing agent includes placing the solid particles on a vacuum for a time, such as at least 1 hour, or at least 12 hours, or from 1 hours to 12 hours, or 15 hours, to form a powder.

The powder has a mean volume average particle size from 10 µm, or 20 µm, or 40 µm, or 50 µm to 58 µm, or 60 µm, or 70 µm, or 100 µm, or 200 µm, or 300 µm.

The powder has a sphericity from 0.92, or 0.94 to 0.98, or 0.99, or 1.0. A sphericity of 1.0 indicates a powder particle's surface area is the same as the surface area of a sphere with the same volume as the given particle. In other words, a sphericity of 1.0 indicates a powder particle is spherical in shape with no surface voids.

The powder has a particle size distribution from 1.0, or 1.1, or 1.2 to 1.3, or 1.4, or 1.5, or 1.6, or 1.7, or 1.8, or 1.9, or less than 2.0. A particle size distribution from 1 to less than 2 indicates the powder includes particles of the same size, or substantially the same size.

The powder has a particle density from 98% to 100%. In an embodiment, the powder has a particle density of 100%. A particle density of 100% indicates a powder includes particles with no voids. The powder is a low porosity powder. A "low porosity" powder is a powder containing single particles with a particle density from 98% to 100%. A low porosity powder excludes powders containing agglomerates, which have a particle density of less than 80%.

In an embodiment, the powder has a D10 particle size from 1.0 µm, or 5.0 µm, or 15 µm, or 20 µm, or 25 µm, or 30 µm to 40 µm, or 45 µm, or 50 µm. In an embodiment, the powder has a D90 particle size from 1 µm, 10 µm, or 20 µm, or 50 µm, or 60 µm, or 70 µm, or 80 µm, or 90 µm, or 100 µm to 110 µm, or 115 µm, or 120 µm, or 130 µm, or 140 µm, or 150 μm, or 200 μm, or 250 μm, or 270 μm, or 300 μm, or 350 μm, or 400 μm, or 440 μm, or 450 μm, or 460 μm.

The powder has a flow rate in a large funnel from 1.0 sec, or 1.5 sec to 2.9 sec, or 3.0 sec, or 5.0 sec.

In an embodiment, the powder has a flow rate in a small funnel from 10 sec, or 15 sec, or 20 sec, or 25 sec to 28 sec, or 30 sec, or 50 sec.

In an embodiment, the powder has the following properties: (i) a mean volume average particle size from 10 μm, or 20 μm, or 40 μm, or 50 μm to 58 μm, or 60 μm, or 70 μm, or 100 μm, or 200 μm, or 300 μm; (ii) a sphericity from 0.92, or 0.94 to 0.98, or 0.99, or 1.0; (iii) a particle size distribution from 1.0, or 1.1, or 1.2 to 1.3, or 1.4, or 1.5, or 1.6, or 1.7, or 1.8, or 1.9, or less than 2.0; (iv) a particle density from 98% to 100%; and (v) a flow rate in a large funnel from 1.0 sec, or 1.5 sec to 2.9 sec, or 3.0 sec, or 5.0 sec; and the powder optionally has one, some or all of the following properties: (vi) a D10 particle size from 1.0 μm, or 5.0 μm, or 15 μm, or 20 μm, or 25 μm, or 30 μm to 40 μm, or 45 μm, or 50 μm; and/or (vii) a D90 particle size from 1 μm, 10 μm, or 20 μm, or 50 μm, or 60 μm, or 70 μm, or 80 μm, or 90 μm, or 100 μm to 110 μm, or 115 μm, or 120 μm, or 130 μm, or 140 μm, or 150 μm, or 200 μm, or; and/or (viii) a flow rate in a small funnel from 10 sec, or 15 sec, or 20 sec, or 25 sec to 28 sec, or 30 sec, or 50 sec.

In an embodiment, the powder is void of, or substantially void of, agglomerates.

The removing the washing agent step may comprise two or more embodiments discussed herein.

ix. Optionally Coating the Powder with a Flow Aid

In an embodiment, the present process includes the step of coating the powder with a flow aid.

Nonlimiting examples of suitable flow aids include talc (such as ultra talc), silica-based flow aids (such as fumed silica, colloidal silica, silicon dioxide, and calcium silicate), clay (such as kaolin clay), diatomaceous earth, limestone, and combinations thereof. In an embodiment, the powder contains from 0.05 wt %, or 1.0 wt % to 1.5 wt %, or 2.0 wt % flow aid, based on the total weight of the powder.

In an embodiment, the coating the powder with the flow aid involves mixing the flow aid with the powder, such as using a speed mixer cup in a dual axis mixer.

In an embodiment, the powder is not fully dry before the powder is coated with the flow aid. After the powder is coated with the flow aid, the remaining washing agent is removed to form a fully dry powder. The remaining washing agent may be removed via any washing agent removal process disclosed herein.

The coating the powder step may comprise two or more embodiments discussed herein.

In an embodiment, the process includes: (i) providing a polyolefin aqueous dispersion having from 50 wt % to 90 wt % solids content of dispersion, the polyolefin aqueous dispersion comprising (a) solid particles comprising an ethylene/α-olefin multi-block copolymer having a melting temperature from greater than 115° C. to 140° C.; an ethylene-based wax; an acrylic dispersant; (b) an aqueous phase comprising excess acrylic dispersant; (ii) adding diluting water to the polyolefin aqueous dispersion to form a diluted polyolefin aqueous dispersion having from 5 wt % to 60 wt % solids content of dispersion; (v) collecting solid particles from the diluted polyolefin aqueous dispersion; (vi) washing the solid particles with a washing agent comprising (a) first washing the solid particles with water and (b) second washing the solid particles with acetone; (v) removing the water and the acetone to form a powder, the powder having: (1) a mean volume average particle size from 10 μm, or 20 μm, or 40 μm, or 50 μm to 58 μm, or 60 μm, or 70 μm, or 100 μm, or 200 μm, or 300 μm; (2) a sphericity from 0.92, or 0.94 to 0.98, or 0.99, or 1.0; (3) a particle size distribution from 1.0, or 1.1, or 1.2 to 1.3, or 1.4, or 1.5, or 1.6, or 1.7, or 1.8, or 1.9, or less than 2.0; (4) a particle density from 98% to 100%; and (5) a flow rate in a large funnel from 1.0 sec, or 1.5 sec to 2.9 sec, or 3.0 sec, or 5.0 sec; and (vi) coating the powder with a flow aid.

In an embodiment, steps (i) and (ii) are performed simultaneously. Step (iii) is performed after steps (i) and (ii). Steps (iii)-(v), are performed sequentially. Step (vi) is performed after at least a portion of the water and the solvent have been removed in step (v).

The process may comprise two or more embodiments discussed herein.

The present disclosure also provides a powder produced by the present process.

Powder

The present disclosure relates to a powder. The powder includes (a) an ethylene-based polymer having a melting temperature from greater than 115° C. to 140° C.; and (b) from 1 wt % to 15 wt % of an acrylic dispersant; (c) a polyolefin wax; and (d) optionally, an additive.

The ethylene-based polymer may be any ethylene-based polymer disclosed herein. The polyolefin wax may be any polyolefin wax disclosed herein. The acrylic dispersant may be any acrylic dispersant disclosed herein. The optional additive may be any optional additive disclosed herein. The powder may be any powder disclosed herein.

In an embodiment, the powder contains, consists essentially of, or consists of: (a) from 60 wt %, or 70 wt % to 80 wt %, or 86 wt %, or 90 wt % of the ethylene-based polymer; (b) from 2 wt %, or 3 wt %, or 5 wt %, or 7 wt % to 8 wt %, or 20 wt % of the acrylic dispersant; and (c) from 5 wt %, or 10 wt %, or 11 wt % to 15 wt %, or 20 wt % of the polyolefin wax; and the powder has: (i) a mean volume average particle size from 20 μm, or 40 μm, or 50 μm to 58 μm, or 60 μm, or 70 μm, or 100 μm; (ii) a sphericity from 0.92, or 0.94 to 0.98, or 0.99, or 1.0; (iii) a particle size distribution from 1.0, or 1.4 to 1.9, or less than 2.0; (iv) a particle density from 98% to 100%; (v) a flow rate in a large funnel from 1 sec, or 2 sec to 3 sec, or 5 sec; (vi) optionally, a D10 particle size from 20 μm, or 25 μm, or 30 μm to 40 μm, or 45 μm, or 50 μm; (vii) optionally, a D90 particle size from 80 μm, or 90 μm, or 100 μm to 110 μm, or 115 μm, or 120 μm, or 130 μm, or 140 μm, or 150 μm; and (viii) optionally, a flow rate in a small funnel from 10 sec, or 15 sec, or 20 sec, or 25 sec to 28 sec, or 30 sec, or 50 sec.

It is understood that the sum of the components in each of the powders disclosed herein, including the foregoing powders, yields 100 wt %.

In an embodiment, the ethylene-based polymer contains a blend of two or more ethylene-based polymers, such as a blend of ethylene/α-olefin multi-block copolymer and LDPE.

In an embodiment, the powder is void of, or substantially void of, agglomerates.

The present powder is useful in 3D-printing such as in a powder bed fusion technique. The present powder is also useful in application such as rotomolding and powder coatings.

The powder may comprise two or more embodiments discussed herein.

By way of example, and not limitation, some embodiments of the present disclosure will now be described in detail in the following Examples.

EXAMPLES

Materials used in the examples are provided in Table 1 below.

TABLE 1

| Material/Description | Properties | Source |
|---|---|---|
| INFUSE ™ 9507 | ethylene/1-octene multi-block copolymer; density = 0.866 g/cc; melting point = 119° C.; melt index (190° C./2.16 kg) = 5.0 g/10 min | The Dow Chemical Company |
| AD-A | acrylic dispersant, ethylhexyl acrylate/ methylmethacrylate/ methacrylic acid terpolymer; 74 wt % 2-EHA*, 2 wt % MMA*; 24 wt % MAA*; Tg = −20° C.; acid value = 153 mg KOH/g; viscosity = 80 mPa · s; pH = 4.4; interfacial tension = 18.98 dynes/cm; liquid | Produced as described below |
| Licocene ™ PE MA 4351 (Licocene 4351) | maleic anhydride grafted polyethylene wax; density = 0.99 g/cc; drop point = 123° C.; acid value = 45 mg KOH/g; melt viscosity at 140° C. = 200-500 mPa · s | Clariant |

*Based on total weight of the dispersant

Preparation of Acrylic Dispersant a (AD-A)

Acrylic Dispersant A (AD-A) is prepared by adding 3210 grams (g) of DI water to a 4 liter (L) 4-neck glass flask equipped with overhead stirring, a condenser, and a heating mantle connected to a temperature controller that is set to modulate a pot-lifter. The flask is placed under nitrogen and heated to 80° C. Concurrently, a monomer emulsion is constructed by mixing 3107 g DI water, 70.1 g Aerosol™ A-102 Surfactant (disodium ethoxylated alcohol ($C_{10-12}$) half ester of sulfosuccinic acid, available from CYTEC Industries Inc.), 165.1 g FES-32 Surfactant (sodium lauryl ether sulfate, available from BASF Corporation), 6777.1 g 2-ethylhexyl acrylate, 183.2 g methyl methacrylate, and 2198.0 g MAA to form a thick white stable emulsion. Once the reactor temperature is stabilized at 80° C., 220 g of PRIMAL™ E-1476 acrylic preform (110 nm and 45 wt % solids, available from The Dow Chemical Company) is added to the reactor, followed by a solution of 216.8 g DI water and 6.9 g ammonium persulfate. An initiator co-feed solution is made using 462.9 g DI water and 11.4 g ammonium persulfate. The monomer emulsion is fed into the reactor at a rate of 37 g/min and the initiator co-feed solution is fed into the reactor at a rate of 1.4 g/min. After 20 minutes, the monomer emulsion feed rate is increased to 74 g/min and the initiator co-feed solution feed rate is increased to 2.8 g/min. At the end of the monomer and initiator feeds, the lines are rinsed and the reaction is held at 80° C. for 30 minutes. Subsequently, the reaction mixture is cooled to 60° C. A solution of 0.06 g iron(II) sulfate heptahydrate in 41.7 g DI water is added to the reactor. A (i) solution of initiator, containing 279.8 g DI water, 4.2 g FES-32 Surfactant and 6.9 g Luperox™ TAH-85 (a polymer initiator, available from Arkema), and a (ii) solution of reductant containing 281.5 g DI water and 9.4 g sodium sulfoxylate formaldehyde are added to the reaction at the rate of 9.7 g/min. At the end of the feeds, the reaction mixture is cooled to room temperature and filtered through a 100 μm filter.

The resulting polymer is Acrylic Dispersant A (AD-A) containing 74 wt % 2-EHA, 2 wt % MMA; and 24 wt % MAA, based on the total weight of the dispersant. AD-A has low residual monomer, a final solids wt % of 50.1 wt %, a PDI of 3.3, and an interfacial tension of 18.98 dynes/cm (vs Lucant™ LX001 at 60° C.).

Preparation of Aqueous Dispersions

Aqueous dispersions are prepared using the BLUE-WAVE™ extruder process of The Dow Chemical Company using the extruder of the FIGURE. The dispersions are prepared using a 25 mm Berstorff™ (X-line) twin-screw extruder. The INFUSE™ 9500 is added to the extruder as a pellet through a large Schenk™ feeder that drops into a feed throat. The Licocene™ PE MA 4351 is added to the extruder as a pellet or powder using a KQX K-Tron™ feeder that also drops into the feed throat. The temperature profile for the mix and convey zone, including Zones 1-3 of the extruder is as follows: Zone 1=25° C.; Zone 2=90° C.; Zone 3 temperature is provided in Table 2. The acrylic dispersant (AD-A) is added to the extruder as a liquid via a 1000D ISCO™ syringe pump. The acrylic dispersant enters the extruder through an injector (without a pin) that is located in Zone 5A. The initial water is added to the extruder via a 500D ISCO™ pump through an injector (with a pin) that is located in Zone 4B. The base (DMEA) is utilized to provide 140% neutralization when a polyolefin wax or an acrylic dispersant are used. The base is added to the extruder via a 500D ISCO™ pump that is piped in with the initial water. The base enters the extruder through Zone 4B. Finally, 7 dilution water is delivered via a large Hydracell™ pump through an injector that is placed in Zone 8A.

The extrusion conditions are provided in Table 2.

TABLE 2

| Polyolefin Feed Rate (g/min) | Dispersant Feed Rate (g/min) | Polyolefin Wax Feed Rate (g/min) | Initial Water Feed Rate (g/min) | Base Feed Rate (mL/min) | Dilution Water Feed Rate (mL/min) | Extruder Temp. in Zone 3 (° C.) | Extruder Speed (rpm) | Extruder Pressure in Zone 12 (psi) | Solids Content of Dispersion After Dilution (wt %) |
|---|---|---|---|---|---|---|---|---|---|
| INFUSE ™ 9507 75.67 | AD-A 7.46 | Licocene 4351 7.567 | 11.48 | DMEA 1.86 | 100 | 160 | 450 | 235 | 45 |

The composition and properties of the powder are provided in Table 3.

TABLE 3

| Powder Composition[#] | wt % water during emulsification[*] | Mean Volume Average Particle Size (μm) | D10 (μm) | D90 (μm) | Particle Size Distribution | Sphericity |
|---|---|---|---|---|---|---|
| 86 wt % INFUSE ™ 9507 (multi-block) 3 wt % AD-A 11 wt % Licocene ™ PE MA 4351 | 65 | 57.5 | 30.2 | 110 | 1.85 | 0.94 |

[#]wt % based on the total weight of the powder. Each sample has a total wt % of 100 wt %.
[*]wt % water in the emulsification zone prior to dilution, based on the total weight of the polyolefin aqueous dispersion.

Sample 1 Powder Formation Process
A. Diluting with Water, Collecting the Solid Particles, Washing with Washing Agent One (1) kg of the aqueous dispersion is collected from the extruder and diluted in a 5 gallon bucket with 2.5 gallons of DI water. The diluted sample is then mixed manually until the sample is re-dispersed, after which it is left undisturbed for two hours, until the particles having a mean volume average particle size of 10-300 μm rise to the top of the bucket and form a layer. Approximately 200 grams of sample is collected off the surface of the DI water wash bucket during the skimming step. The collected sample is washed with water by being re-dispersed into 500 mL of DI water.

A Grade 4, 240 mm Whatman™ filter is placed in a two-piece polypropylene Buchner funnel and wetted. The Buchner funnel is placed over a filtering flash, which is attached to a small vacuum pump. The vacuum pump is started and a portion of the sample is poured over the filter paper to develop a cake. When the cake forms, the remaining sample is slowly added to the Buchner funnel. When the cake is formed again, an additional 450-500 mL of DI water is used to wash the particles in three stages (~150 mL or more DI water each time). The cake is carefully removed from the filter paper and collected.

Approximately 500 grams of the water washed and filtered sample is transferred to another 1 gallon bucket and mixed with ½ gallon of acetone. The sample is then mixed manually until the sample re-disperses, and is allowed to sit undisturbed for 2 hours until the particles having a mean volume average particle size of 10-300 μm rise to the top of the bucket and form a layer. 250 g of the sample is collected off the surface during a skimming step and transferred into a 200 μm filter bag and rinsed with more acetone (approximately 100 mL acetone). The sample is then removed from the filter bag, placed in an aluminum pan, and broken up by hand.

B. Removing the Washing Agent and Coating with Flow Aid

The sample is allowed to sit for 30 minutes. Prior to full drying, the sample is weighed and ~1 wt % AEROSIL™ R-972 (fumed silica, available from Evonik Industries) is added to the sample. The container is then closed and held on a Vortex Mixer for 20 seconds to aid in uniformity. The sample is then placed in a cup to be used in a FlackTex, Inc. Speed Mixer. The sample is run for 15 seconds at 3500 rotations per minute (rpm). The sample is then run through a course mesh (800 μm pore size) to remove any large clumps.

The generated powder sample is combined (typically less than or equal to (≤)1 gallon) and then dried fully under air for 36 hours, or vacuum for 12 hours.

The powder formed is a flowable powder. The results are provided in Table 4.

The powder of Sample 1 advantageously exhibits a mean volume average particle size from 10 μm to 300 μm, a sphericity from 0.92 to 1.0, a particle size distribution from 1 to less than 2, a particle density from 98% to 100%, and a flow rate in a large funnel from 1 sec to 5 sec, indicating the powder of Sample 1 is suitable for 3D-printing techniques such as powder bed fusion.

Sample 2 Powder Formation Process (No Collecting the Solid Particles Step)

One (1) kg of the polyolefin aqueous dispersion is collected from the extruder to form a sample.

A Grade 4, 240 mm Whatman™ filter is placed in a two-piece polypropylene Buchner funnel and wetted. The Buchner funnel is placed over a filtering flash, which is attached to a small vacuum pump. The vacuum pump is started and a portion of the sample is poured over the filter paper to develop a cake that is not dried. When the cake forms, the remaining sample is slowly added to the Buchner funnel. When the cake is formed again, an additional 450-500 mL of DI water is used to wash the particles in three stages (~150 mL or more DI water each time). The cake is carefully removed from the filter paper and collected.

Despite the utilization of a vacuum over an extended period of time, the DI water remains above the filter paper, which prevents the formation of a dried cake. Without being bound by any particular theory, it is believed that particles having a mean volume average particle size of less than 10 μm present in Sample 2 prevent efficient filtering. The results are provided in Table 4.

Sample 3 Powder Formation Process (No Washing with Water Step)

Approximately 500 grams of the polyolefin aqueous dispersion is collected from the extruder and is transferred to a 1 gallon bucket and mixed with ½ gallon of acetone. The sample is then mixed manually until the sample re-disperses, and is allowed to sit undisturbed for 2 hours until the particles having a mean volume average particle size of 10-300 μm rise to the top of the bucket and form a layer. 250 g of the sample is collected off the surface during a skimming step and transferred into a 200 μm filter bag and rinsed with more acetone (approximately 100 mL acetone). The sample is then removed from the filter bag, placed in an aluminum pan, and broken up by hand.

The sample is allowed to sit for 30 minutes. Prior to full drying, the sample is weighed and ~1 wt % AEROSIL™ R-972 (fumed silica, available from Evonik Industries) is added to the sample. The container is then closed and held on a Vortex Mixer for 20 seconds to aid in uniformity. The sample is then placed in a cup to be used in a FlackTex, Inc. Speed Mixer. The sample is run for 15 seconds at 3500 rotations per minute (rpm). The sample is then run through a course mesh (800 μm pore size) to remove any large clumps.

The generated powder sample is combined (typically less than or equal to (≤)1 gallon) and then dried fully under air for 36 hours, or vacuum for 12 hours.

The powder formed is not free flowing and is tacky. The results are provided in Table 4.

Sample 4 Powder Formation Process (No Washing with Solvent Step)

One (1) kg of the aqueous dispersion is collected from the extruder and diluted in a 5 gallon bucket with 2.5 gallons of DI water. The diluted sample is then mixed manually until the sample is re-dispersed, after which it is left undisturbed for two hours, until the particles having a mean volume average particle size of 10-300 μm rise to the top of the bucket and form a layer. Approximately 200 grams of sample is collected off the surface of the DI water wash bucket during the skimming step. The collected sample is washed with water by being re-dispersed into 500 mL of DI water.

A Grade 4, 240 mm Whatman™ filter is placed in a two-piece polypropylene Buchner funnel and wetted. The Buchner funnel is placed over a filtering flask, which is attached to a small vacuum pump. The vacuum pump is started and a portion of the sample is poured over the filter paper to develop a cake. When the cake forms, the remaining sample is slowly added to the Buchner funnel. When the cake is formed again, an additional 450-500 mL of DI water is used to second wash the particles in three stages (~150 mL or more DI water each time). The cake is carefully removed from the filter paper and collected. The cake is then placed in an aluminum pan and broken up by hand.

The sample is allowed to sit for 30 minutes. Prior to full drying, the sample is weighed and ~1 wt % AEROSIL™ R-972 (fumed silica, available from Evonik Industries) is added to the sample. The container is then closed and held on a Vortex Mixer for 20 seconds to aid in uniformity. The sample is then placed in a cup to be used in a FlackTex, Inc. Speed Mixer. The sample is run for 15 seconds at 3500 rotations per minute (rpm). The sample is then run through a course mesh (800 μm pore size) to remove any large clumps.

The generated powder sample is combined (typically less than or equal to (≤)1 gallon) and then dried fully under air for 36 hours, or vacuum for 12 hours.

The powder formed is agglomerated and clumped. The sample is collected through the course mesh. The results are provided in Table 4.

Sample 5 Powder Formation Process

Sample 5 is formed into a powder in accordance with the procedures of Sample 1, except that the sample is allowed to fully dry after the acetone wash, before the addition of the flow aid.

The powder formed is agglomerated and clumped. The sample is collected through the course mesh. The results are provided in Table 4.

Sample 6 Powder Formation Process

Sample 6 is formed into a powder in accordance with the procedures of Sample 1, except that the sample is allowed to fully dry after washing with water, before washing with acetone.

The powder formed is agglomerated and clumped, and could not be broken up by hand. The sample is collected through the course mesh. The results are provided in Table 4.

Results

The properties of each powder is provided in Table 4. Sample 1 produced a powder with a particle density of 100%. Flow of the powder is measured as a function of the time it takes for 50 g powder to flow through a large funnel and a small funnel. The results are provided in Table 4.

TABLE 4

| Sample | Yield After Initial Filtration and Water Rinse (%) | wt % passed through the 800 μm course mesh | Flow in Large Funnel (sec) | Flow in Small Funnel (sec) |
| --- | --- | --- | --- | --- |
| Sample 1 | 98 | 99 | 2.82 | 27.42 |
| Sample 2 | 5 | NM | NM | NM |
| Sample 3 | 98 | 92 | 6.2* | >360* |
| Sample 4 | 98 | 5 | NM | NM |
| Sample 5 | 98 | 1 | NM | NM |
| Sample 6 | 98 | 1 | NM | NM |

*Required tapping of the funnel to enable flow.
NM = not measured because powder was not isolatable in a reasonable quantity Sample 1 advantageously exhibits sufficient flowability, as evidenced by a flow rate through a large funnel of 2.82 seconds and a flow rate through a small tunnel of 27.42 seconds. A flow rate in a large funnel from 1 sec to 5 sec and a flow rate in a small funnel from 10 sec to 50 sec is advantageous for efficient loading of a 3D-printer with the powder.

It is specifically intended that the present disclosure not be limited to the embodiments and illustrations contained herein, but include modified forms of those embodiments including portions of the embodiments and combinations of elements of different embodiments as come within the scope of the following claims.

We claim:
1. A process comprising:
(i) providing a polyolefin aqueous dispersion having from 50 wt % to 90 wt % solids content of dispersion, the polyolefin aqueous dispersion comprising
   (a) solid particles comprising
      a polyolefin comprising an ethylene-based polymer having a melting temperature from greater than 115° C. to 140° C.;
      a polyolefin wax;
      an acrylic dispersant;
   (b) an aqueous phase comprising excess acrylic dispersant;

(ii) adding diluting water to the polyolefin aqueous dispersion to form a diluted polyolefin aqueous dispersion having from 5 wt % to less than 50 wt % solids content of dispersion;

(iii) collecting the solid particles from the diluted polyolefin aqueous dispersion;

(iv) washing the solid particles with a washing agent to remove the excess acrylic dispersant; and (v) removing the washing agent to form a powder, the powder having a mean volume average particle size from 10 μm to 300 μm, a sphericity from 0.92 to 1.0, a particle size distribution from 1 to less than 2, a particle density from 98% to 100%, and a flow rate in a large funnel from 1 sec to 5 sec.

2. The process of claim 1 wherein the polyolefin is an ethylene/α-olefin multi-block copolymer.

3. The process of claim 1 wherein the acrylic dispersant comprises an ethylhexyl acrylate/methylmethacrylate/methacrylic acid terpolymer.

4. The process of claim 1 wherein the acrylic dispersant is an ethylhexyl acrylate/methylmethacrylate/methacrylic acid terpolymer.

5. The process of claim 1 wherein the collecting step comprises skimming the solid particles from a top portion of the diluted polyolefin aqueous dispersion.

6. The process of claim 1 wherein the collecting step comprises filtering the diluted polyolefin aqueous dispersion through a filtering device.

7. The process of claim 1 wherein the washing agent is a polar solvent.

8. The process of claim 1 wherein the washing agent is selected from the group consisting of water, acetone, and combinations thereof.

9. The process of claim 1 wherein the (iv) washing comprises
washing the solid particles with a washing agent that is water, and
washing the solid particles with another washing agent that is acetone.

10. The process of claim 1 comprising removing the washing agent to form a powder that is not agglomerated.

11. The process of claim 1 further comprising
(vi) coating the powder with a flow aid.

12. The process of claim 11 comprising coating the powder with a flow aid that is fumed silica.

13. The process of claim 1 comprising performing steps (i) and (ii) simultaneously.

14. The process of claim 1 comprising performing steps (iii)-(v) sequentially, after steps (i)-(ii).

15. The process of claim 1 comprising forming a powder having a flow rate in a small funnel from 10 sec to 50 sec.

* * * * *